United States Patent [19]

Robecchi

[11] Patent Number: 4,931,030

[45] Date of Patent: Jun. 5, 1990

[54] FLEXIBLE BELT AND RELATIVE DRIVING SYSTEM

[75] Inventor: Edoardo Robecchi, Milan, Italy

[73] Assignee: Pirelli Transmissioni Industriali S.p.A., Italy

[21] Appl. No.: 343,723

[22] Filed: Apr. 27, 1989

[30] Foreign Application Priority Data

Apr. 27, 1988 [IT]  Italy .............................. 20338 A/88

[51] Int. Cl.$^5$ .............................................. F16G 1/10
[52] U.S. Cl. .................................... 474/237; 474/268
[58] Field of Search ............... 474/237, 263, 240–245, 474/265, 268; 156/137–142

[56]  References Cited

U.S. PATENT DOCUMENTS

| 2,255,884 | 9/1941 | Hedgpeth | 74/234 |
| 2,273,200 | 2/1942 | Hoff | 152/359 |
| 2,792,319 | 5/1957 | Fihe | 154/58.2 |
| 3,160,193 | 12/1964 | Baggett | 152/359 |
| 4,571,230 | 2/1986 | Woodland | 474/265 X |
| 4,822,324 | 4/1989 | Georget | 474/268 |

FOREIGN PATENT DOCUMENTS 1104819 10/1965 United Kingdom .
1123225 8/1968 United Kingdom .

Primary Examiner—Thuy M. Bui
Attorney, Agent, or Firm—Stevens, Davis, Miller & Mosher

[57]  ABSTRACT

An elastically extensible flexible belt is provided which comprises an annular body of elastomeric material in which is embedded a plurality of elongated elements arranged along a surface corresponding to the position of the neutral axis of the belt. The belt is characterized in that each elongated element, at 1/10 of its ultimate tensile stress, has an elongation value able to balance a shrinkage value of the innermost surface of the belt, ranging between two limit values $\epsilon_1 \epsilon_2$ corresponding to the bending of the belt according to two pre-established curvatures. The first curvature is represented by a circumference whose radius $r_1$ is equal to 60% of the radius R of the circumferential development of the annular body in correspondence of the elongated elements and the second curvature is represented by a circumference whose radius $r_2$ corresponds to 35% of the radius R of the circumferential development of the annular body.

19 Claims, 1 Drawing Sheet

FLEXIBLE BELT AND RELATIVE DRIVING SYSTEM

FIELD OF THE INVENTION

The present invention concerns a flexible belt and the relative driving system and, more precisely, it relates to an elastically extensible belt of elastomeric material, which must be assembled between at least two pulleys with respect to which it transmits, by friction, forces able to generate motion.

BACKGROUND OF THE INVENTION

As is known, belts made of elastomeric material intended to be assembled around at least two pulleys and to exchange, on appropriate surfaces, friction forces able to transmit motion, comprise substantially a ring-shaped body which has embedded therein in a same plane a plurality of tension-resistant elongated elements whose main feature is their inextensibility.

The belt body is internally and externally limited by a pair of base surfaces and, laterally, by a pair of opposite sides.

Belts of the above type can have an V-shaped section and can transmit the friction forces by their sides, or a flat section and transmit the friction forces by at least one of their bases. Alternatively, they can be of the Poly-V type, identified in cross section by a base surface comprising several V-shaped longitudinal grooves arranged side-by-side.

These belts find application in many fields, and in particular they are mainly used for power drives in which one of the pulleys can have very small take-up diameters, in some cases 70 mm, and often even smaller, ranging between 40 and 50 mm. Moreover, the present technical trend is to use the above belts on pulleys having diameters of 15 or 16 mm.

Unfortunately, the application of the belt on a pulley having a high curvature may lead to a reduction in the belt life.

In fact, considering for instance a Poly-V belt mounted on the corresponding pulley, it can be noted—as known to the technicians of this field—that the stresses are distributed on the two parts of the annular body, i.e. above and below the surface containing the elongated elements; more precisely, the belt portion above these elements is subjected to tension, while that below them is subjected to compression. At said surface containing the reinforcing elements, due to the inextensibility of the reinforcing elements, no deformations occur and said surface can be defined as a "neutral axis," or "pitch surface," of the belt.

The compression of the considered belt portion is greater the greater the pulley curvature, with a consequent high deformation of the elastomeric material which may give rise to substantially undulated configurations in areas corresponding to the joint between the longitudinal elements and the annular elastomeric body.

It has been noted that such deformations may originate sooner or later—but in any event in times not permissible for the services required in many industrial applications—resulting in detachment of the elongated elements forming the elastomeric body, with a consequently reduced life of the belt.

The drawbacks ascertained in the Poly-V belts are common to other types of V-shaped or flat belts and can be ascribed also here to the compression of the belt portion underlying the "pitch surface" containing the longitudinal elements and to a "collapse" of the elastomeric material, compelled to deform and to find space to enable said deformation where this is possible, inter alia, towards the elongated elements, with the already known consequences.

SUMMARY OF THE INVENTION

An object of the present invention is to provide a flexible belt made of elastomeric material which is intended to transmit friction forces able to generate motion and the relative driving system comprising said belt and at least two pulleys, in which the above-mentioned disadvantages are eliminated.

Accordingly, an object of the present invention is to provide an elastically extensible belt which comprises a ring-shaped body of elastomeric material and a plurality of tension-resistant elongated elements embedded in said ring-shaped body along a surface substantially corresponding to the position of the neutral axis, said belt, when bent according to a first curvature defined by a circumference having a radius equal to 60% of the radius of the circumferential development of the ring-shaped body at the elongated elements, undergoing a flexion corresponding to a first shrinkage value of its radially innermost surface, and, when bent according to a second curvature defined by a circumference having a radius equal to 35% of the radius of said circumferential development, undergoing a flexion corresponding to a second shrinkage value of said radially innermost surface, the belt being characterized in that each elongated element, at 1/10 of its ultimate tensile stress, has an elongation value which balances a shrinkage value located between said first and said second shrinkage value.

BRIEF DESCRIPTION OF THE DRAWINGS

The present invention will better understood from the following detailed description given only by way of non-limiting example and made with reference to the figures of the attached sheets of drawings, in which.

DETAILED DESCRIPTION OF THE PREFERRED EMBODIMENTS

Figure 1:
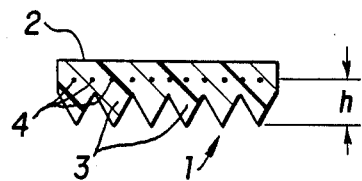
FIG. 1 is sectional view of a multi-groove belt according to the invention.

With reference to FIG. 1, "Poly-v" belt 1 is formed by a flat portion and, in a position opposite to its back 2, by a plurality of longitudinal V-shaped grooves 3.

Belt 1 comprises a body of elastomeric material and a plurality of continuous elongated elements 4 in the form of cords or the like, arranged side-by-side, on a cylindrical surface of belt 1, at a distance "h" from the surface defined by points "V" of the grooves.

The belt body is closed as a ring and the pitch circumferential layout of the belt along cords 4 is obtained by a radius of value R. The main feature of belt 1 is its elastic extensibility, which is due to the geometrical structure of the belt itself.

Substantially, for a given geometry of the belt, defined by parameters "h" and "r", the inventive principle lies in the fact of inserting in the belt body, on its cylindrical surface, a plurality of continuous elongated elements 4 having a pre-established characteristic able to balance a convenient part of the shrinkage of the belt portion compressed by flexion on a curved surface.

The balance of shrinkage due to compression is achieved by elongated elements 4, whose elongation value is selected in accordance with two limit shrinkage conditions, obtained by bending the belt along two curvatures represented by two theoretical circumferences of pre-established radius.

More precisely, a belt having given geometrical characteristics "R" and "h" is theoretically bent only by flexion on two circumferences, the first having a radius $r_2$ equal to 0.6 R and the second having a radius $r_1$ equal to 0.35 R, determining for said configurations the percent shrinkages $\epsilon_1$ and $\epsilon_2$ of the innermost base surface of the belt, namely that represented by the points of the grooves.

When values $\epsilon_1$ and $\epsilon_2$ have been determined, elongated elements 4 are inserted in the belt; their elongation after vulcanization, at 1/10 of their ultimate tensile stress, must have a percent value ranging between the limit values $\epsilon_1$ and $\epsilon_2$.

Figure 2:
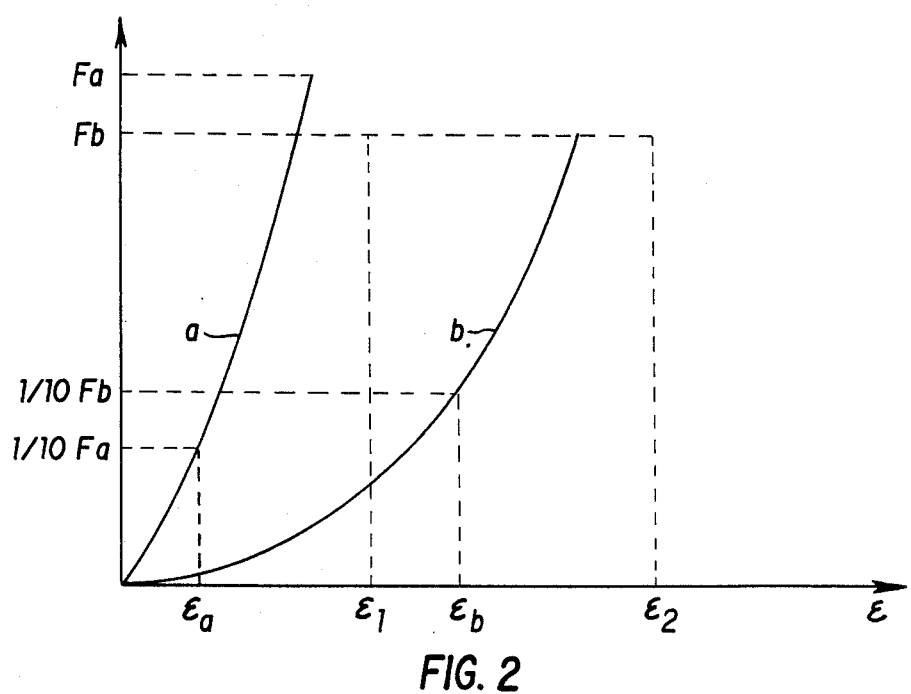
FIG. 2 is a qualitative diagram showing the tensile stresses and the elastic elongation of a continuous elongated element of the belt of FIG. 1.

For the sake of clarity, reference is now made to the stress/deformation qualitative diagram of FIG. 2 relating to elongated element 4, where the abscissae refer to the elongation and the ordinates to the tensile stress.

The two dashed straight lines parallel to the axis of the ordinates correspond to the limit shrinkages $\epsilon_1$, $\epsilon_2$ (changed in sign) referred to the bending of the belt due to flexion only along the two circumferences having a radius $r_1 = 0.6$ R and a radius $r_2 = 0.35$ R respectively.

The elongated element having pre-established extensibility characteristics is chosen as follows.

Considering a cord, whose stress/deformation curve after vulcanization is represented by curve "a" and indicating with Fa its ultimate tensile stress, it can be seen from FIG. 2 that, at 1/10 Fa, elongation $\epsilon_A$ of the cord represented by said curve "a" is not comprised between the limit values $\epsilon_1$ and $\epsilon_2$; consequently, cord "a" is not chosen as elongated element 4 to be inserted in the body of the belt shown in FIG. 1.

Considering now a cord whose stress/deformation curve is represented by curve "b", it can be seen from FIG. 2 that, at 1/10 of its ultimate tensile stress $\epsilon_b$, the cord represented by "b" has an elongation b located between the two values $\epsilon_1$ and $\epsilon_2$; therefore, it can be inserted, in side by-side arrangement with analogous cords, in the body of the Poly-V belt of FIG. 1.

Substantially, as a function of the belt geometry, the choice of elongated elements 4 in the form of cords in accordance with curve "b" of FIG. 2 enables the belt to be mounted between two pulleys at an elastic pretension corresponding to 1/10 of the ultimate tensile stress of each element 4 multiplied by the number of elements, so as to balance, by means of elongation $\epsilon_b$ of the belt, shrinkage values comprised between $\epsilon_1$ and $\epsilon_2$.

This parameter can be determined at once, as briefly explained herebelow.

Indicate with letter "R" the radius representing the belt pitch line L at the neutral axis comprising the elongated elements and with the letter "h" the distance between said axis and the radially innermost surface of the belt, which in FIG. 1 is represented by the points of the grooves.

In this situation, for a generic arc between two given points of the belt, subtended by an angle $\theta$, it will be:

$\theta \times R$ = belt layout at the neutral axis $\theta \times (R\text{-}h)$ = belt layout at distance "h"

Assuming bending of the belt along an arc of radius r, smaller than R, without varying the two points of the belt limiting the arcs, it will be:

$\theta' \times r$ = belt layout at the neutral axis $\theta \times (r\text{-}h)$ = belt layout at distance "h"

From the definition of the neutral axis, i.e., the locus of the points where the fibers of the body subjected to flexion do not suffer elongation or shrinkage, it will be:

$\theta \times R = \theta' \times r$ $\theta' = \theta \times R/r$

The shrinkage at distance "h" from the neutral axis, originated by the bending of the belt by flexion on a circumference of radius r, is given by the difference of the layouts corresponding to R and r referred to the pitch layout, namely taking into account the preceding expressions:

$\epsilon = \theta \times (R\text{-}h) - \theta \times (r\text{-}h) / [\theta \times (r\text{-}h)]$ so that $\epsilon = h (R/r\text{-}1)/(R\text{-}h)$ If, in the final expression of $\epsilon$, r is replaced by the values of $r_1$ and $r_2$ corresponding to 0.6 R and 0.35 R, the following minimum and maximum shrinkage values $\epsilon_1$ and $\epsilon_2$ reported in the diagram of FIG. 2, are obtained:

$\epsilon_1 = 0.667$ h / (R-h)

$\epsilon_2 = 1.86$ h / (R-h)

Consequently, having already available a certain geometry of the belt, defined by "R" and "h", and having found values $\epsilon_1$ and $\epsilon_2$ it is possible to choose the elongated element 4 whose elongation, at 1/10 of its ultimate tensile stress, balances a shrinkage value ranging between $\epsilon_1$ and $\epsilon_2$; finally, by multiplying the number of elements arranged side-by-side by 1/10 of the ultimate tensile stress of each of them, it is possible to evaluate the nominal value of the tension of the belt in use, to which corresponds an elastic elongation able to balance that particular shrinkage value ranging between $\epsilon_1$ and $\epsilon_2$.

Some particular embodiments of a belt according to the invention will not be described.

| First embodiment |
| --- |
| Poly-V belt, 1200 j 6 |
| Pitch layout L = 1178 mm |
| Radius of the pitch layout, R = 1178/2II = 187.5 mm |
| Number of grooves = 6 |
| Groove profile = j according to Standards |
| Groove height = 2 mm |
| Distance h = 3 mm |
| Minimum percent shrinkage value $\epsilon_1$ = 0.667 · h/R-h · 100 = 1.08 |
| Maximum percent shrinkage value $\epsilon_2$ = 1.86 · h/R-h · 100 = 3.02% |

The elongated element whose elongation at 1/10 of its ultimate tensile stress balances the shrinkage ranging between $\epsilon_1$ and $\epsilon_2$ is chosen as a function of the belt parameters R and h.

The data regarding the elongated elements are the following:

| continuous elongated element: | cord formed of two strands each comprising 940 mono- |
| --- | --- |

-continued

|   |   |
|---|---|
|  | filaments (940 × 2) — 48z twists per cm for each strand and 48s twists per cm for the two strands together. Cord diameter = 0.55 mm |
| Ultimate tensile stress = | 145 N (Newton) |
| % elongation of the element at 1/10 of the above value = | 3.5% |
| Insertion formed by | 17 coils of cord situated on the belt surface at a distance "h" from the inner-most surface |
| Ultimate tensile stress of the belt = | 4000 N (2000 on each branch) |
| % elongation at 1/10 of the above value = | 2.75% |

Second embodiment
Poly-V belt

Pitch layout L = 853 mm
Radius of pitch layout R = L/2 = 135.7 mm
Number of grooves = 5
Groove height = 2.7
Groove profile = K according to Stand.s
Distance h = 4.8 mm
Minimum % shrinkage value $\epsilon_1$ = 2.44%
Maximum % shrinkage value $\epsilon_2$ = 6.82%

Data regarding the elongated element:

| continuous elongated element | Nylon 66 1400 × 3 type cord, 31z 31s twists per cm |
|---|---|
| Cord diameter = | 1.1 mm |
| Ultimate tensile stress of the element = | 320 N |
| % elongation at 1/10 of the ultimate tensile stress = | 4% |
| Belt insertion = | 17 coils |
| Ultimate tensile stress of the belt = | 4300 N on each branch |
| % elongation at 1/10 of the ultimate tensile stress of the belt = | 3.25% |

Third embodiment
V-shaped belt

Pitch layout L = 1250 mm
Pitch radius R = 199 mm
Trapezium greater side in cross section = 9.5 mm
Belt total height = 5.5 mm
Angle between sides = 40°
Distance h = 3.8 mm
Minimum % shrinkage value $\epsilon_1$ = 1.3%
Maximum % shrinkage value $\epsilon_2$ = 3.62%

Data regarding the elongated element:

| continuous elongated element | 940 × 2 type cord, 48z 48s twists per cm" |
|---|---|
| Cord diameter = | 0.55 mm |
| Ultimate tensile stress of element = | 145 N |
| elongation at 1/10 of the ultimate tensile stress = | 3.7% |
| Insertion formed by | 10 coils |
| Ultimate tensile stress of the belt = | 2460 N (1230 N on each branch) |
| % elongation at 1/10 of the ultimate tensile stress of the belt = | 2.56% |

The invention is able to achieve all of the above indicated purposes. To demonstrate that said purposes were obtained, the tests carried out on the Poly-V belt of the first embodiment are described herebelow.

The tests had the objective of evaluating the life of a belt according to the invention after a high number of bendings on pulleys having small radii. The equipment used was the following:
Driving pulley, diameter = 80 mm
Driving pulley r.p.m = 3500
Driven pulley, diameter = 30 mm
Driven pulley r.p.m. = 9300

The belt of the first embodiment was mounted between two pulleys situated at such a fixed center distance as to originate an initial assembling elongation of 2%.

The test was interrupted after 700 work hours and the examination of the belt did not show any detachment between the rubber compound and the cords embedded in the belt body.

To better evaluate the validity of the invention, a further test was performed on the belt of the first embodiment; in this case the equipment was changed to simulate a condition of employment concerning a driving system for washing machines.

The equipment used was the following:
Driving pulley, diameter = 18 mm
Driven pulley, diameter = 336 mm The center distance was selected so as to mount the belt with an elongation of approximately 2%. The belt was caused to rotate at low and high speed cycles, in both a clockwise and a counterclockwise direction so as to simulate the washing and centrifugation phases of a washing machine. The test was interrupted after 2000 working cycles, corresponding to the service life of a household appliance, without ascertaining any detachment between the cords and the rubber compound embedding them.

The optimum results obtained can be explained only by hypothesis, due to the multiplicity of the phenomena involved.

In fact, as regards the first test performed on the belt of the first embodiment, it should be noted that the shrinkage values $\epsilon_1$, $\epsilon_2$ resulting from the compression of the innermost surface of the belt bent on the two pulleys of 80 mm and 30 mm, are the following:
$\epsilon_1 = 6\%$
$\epsilon_2 = 18.7\%$ Further, it should be noted that the belt was mounted between the two pulleys with a preliminary tension corresponding to an elongation of approximately 2%; in other words, the elongation characteristics of the belt are such that it can balance about ⅓ of the shrinkage originated by its bending on the greatest pulley, but can compensate only in a minimum part the shrinkage due to its bending on the smallest pulley.

However, in spite of the above, the first test showed surprisingly that the belt according to the first embodiment remained in one piece even if subjected to cyclic bending stresses on a pulley having a diameter of 30 mm.

In this connection, in an attempt to explain the unexpected results obtained, the following hypothesis is made.

The belt under test comprises long portions to be taken up on the pulley having the greatest diameter and very reduced portions being taken up on the smallest pulley.

The behavior of the belt, in particular the phenomena occurring in the material constituting it, would be significantly influenced by the extent of the take up arc on the pulley of greater diameter, so that the fact of having eliminated the majority of the drawbacks, related to shrinkage, which take place on said pulley is by itself a useful contribution to the prolongation of the belt life even if, apparently, there still are phenomena of unbalanced shrinkage by compression in the smallest pulley.

It can be thought, e.g., that the belt life depends on the event originated by its winding on the two pulleys but that—due to the difference of the concerned portions—what happens on the smallest pulley is not sufficient to prejudice the prolongation of the belt life consequent to the elimination of the majority of the drawbacks noted on the greatest pulley.

This hypothesis is confirmed by the results of the second test carried out on the same belt mounted with an elongation of approximately 2% on two pulleys, one of which has a large diameter, corresponding to 336 mm, and the other having an extremely small diameter, corresponding to 18 mm, with a shrinkage value in the innermost surface of about 0.2% for the largest pulley and of about 32% for the smallest pulley.

As it can be noted, in this test situation, the largest pulley has a relevant circumferential layout, while the smallest pulley, due to its dimensions, is very critical for the shrinkage originated by compression.

However, a total balance of the shrinkage due to compression, on the largest pulley and for long belt portions, seems sufficient by itself to prolong the belt life so that the latter may last as long as the equipment without any prejudice.

In other words, it can be said that the small belt portion bent time by time on the smallest pulley is subjected to high shrinkage, but this inconvenience is so localized in a little space and for a short time that it cannot affect the overall belt, at least for the time intervals which have been considered.

As it can be noted, the results of the tests tend to confirm the validity of the belt features, with elongation values greater than 1/10 and in any case located in the cited range $\epsilon_1$ and $\epsilon_2$.

With respect to elongation values out of the range $\epsilon_1$-$\epsilon_2$, at 1/10 of the ultimate tensile stress, at values smaller than $\epsilon_1$ the belt would be scarcely extensible; therefore, the elongated elements therein contained would not allow elongations able to balance the shrinkage by compression, and, at values greater than $\epsilon_2$ the belt would be too elastic, with the risk of losing the assembly tension pre-established for a given operation.

Figure 3:
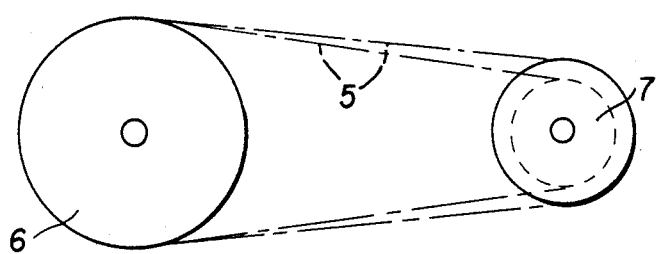
FIG. 3 shows schematically a driving system comprising a V-shaped belt mounted between two pulleys, one of which is of the expanding type.
Figure 4:
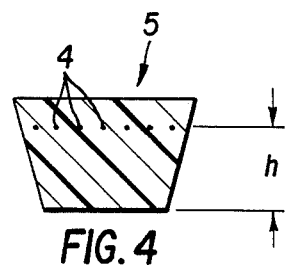
FIG. 4 is a sectional view of the V-shaped belt of FIG. 3, and FIGS. 5 and 6 show respectively in section and in side view a flat belt and the relative driving system according to the invention.
Figure 6:
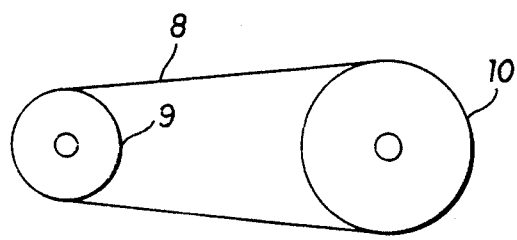

The present invention can be applied to belts having a section different from that of the above-described Poly-V belt; as shown in FIG. 3, it can be applied, e.g., to a belt 5 of trapezoidal section for a stepless speed change gear in which, by way of example, the largest pulley 6 has a fixed trapezoidal groove and the smallest pulley 7 a variable trapezoidal groove.

Also by way of example, the invention can be applied according to the same principles, to a flat belt provided with continuous elongated elements able to confer to the belt an elastic extensibility located in the desired range.

Figure 5:
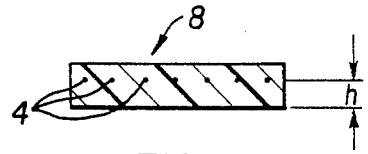

For instance, such belt 8 might be mounted (FIG. 5) between two pulleys 9, 10, whose fixed center distance is such as to determine the elongation and therefore the preliminary elastic tension of the belt itself.

The flat belt might have a rectangular cross section or any other section, inter alia, with a curvilinear shape on one of the two base surfaces or any other shape provided that—whichever solution is adopted—at least one of the two base surfaces is able to transmit, by friction, forces able to generate motion with at least a corresponding outer surface of a pulley.

The invention is described with reference to the characteristic of extensibility of the belt.

The elongation of the elongated elements gives rise to the elastic extensibility of the belt; however, it is to be taken into account that the stress/deformation curve of each element is drawn at room temperature and that, in practice, when the element is inserted in the belt and the latter is vulcanized, a modification of the stress/deformation curve might be ascertained when specific materials are used to form the cords.

In practice, at high curing temperatures, the cords inserted in the elastomeric mass, under equal tension forces, may show variations in their elongation characteristics. Further, also when the cords are treated with an adhesive agent, their extensibility characteristics may undergo modifications.

These variations, depending on the treatment to which the cords and the belt are subjected, may be conveniently exploited to obtain a stress/deformation curve of the overall belt which is the most appropriate to balance the shrinkage by compression to which the belt being taken up on the pulley is subjected in use.

Moreover, it is possible to manufacture belts in which the cords are different from those described in the above indicated embodiments.

For instance, the Poly-V belt of the first embodiment might comprise elongated elements other than cords, as for example, monofilaments or cords of a material different from nylon, provided that in the various possible solutions said elements—according to their dimensional characteristics and to the treatment undergone after their incorporation in the belt—are able to originate an ultimate tensile stress of 4000 N and, at 1/10 of said ultimate tensile stress, an elongation of the belt ranging from 1.08% to 3.02%.

The same considerations concerning the different materials to be used for the elongated elements may be made also in respect of the belts described in the other embodiments described above.

Further embodiments might be represented by, e.g., Poly-V or V-shaped or flat belts comprising elongated elements made of rayon or polyester cords made up, as to the number of twists and the methods of treatment, in such a way as to originate elongations greater than 1% and, e.g., elongations ranging between 1% and 15%.

Moreover, the Poly-V belt according to the invention might be used in a driving system in which one of the pulleys comprises an outer surface grooved like the belt and the other pulley comprises a cylindrical, smooth outer surface.

In all the above-described embodiments, the belts can comprise layers of fabric, in particular covering fabric, each prepared and built up with such an extensibility as not to hinder the elastic elongation of the belt determined by the elongated elements present in the elastomeric compound.

In all of these embodiments, the fabrics present in the belt do not affect the ultimate tensile stress of the belt, which is chiefly determined by the elongated elements embedded in the ring-shaped body on a surface corresponding to the pitch surface.

Although some particular embodiments of the present invention have been described and illustrated herein, it should be understood that the scope of the invention comprises many other variations evident to a technician of this field; for instance, the belt might have a cross section different from those indicated above, as for example, a circular section, to be mounted between two pulleys having a V-shaped race.

What is claimed is:

1. An elastically extensible belt, comprising:
An annular body made of elastomeric material; and a plurality of elongated elements resistant to tensile stress, embedded in said annular body along a surface substantially corresponding to the position of a neutral axis of said annular body, said belt being bent along a first curvature characterized by a circumference having a radius $r_1$ equal to 60% of a radius R of a circumferential development of said annular body corresponding to said elongated elements undergoing bending to which derive a first shrinkage value $\epsilon_1$ of a radially innermost surface of said annular body and bent along a second curvature characterized by a circumference having a radius $r_2$ equal to 35% of said radius R of said circumferential development undergoing bending to which derives a second shrinkage value $\epsilon_2$ of said radially innermost surface, each of said elongated elements, at 1/10 of its ultimate tensile stress, having an elongation value that balances a shrinkage value ranging between said first and said second shrinkage value.

2. A belt as in claim 1, wherein said elongated elements are cords.

3. A belt as in claim 1, wherein said elongated elements are nylon cords.

4. A belt as in claim 3, wherein each cord is of a 940×2 type, 48 z, 48 s twists per cm type.

5. A belt as in claim 3, wherein each cord is of a 1400×3 nylon 66, 31 z 31 s twists per cm type.

6. A belt as in claim 1, wherein said annular body has a trapezoidal section having sides adapted to transmit forces by friction on corresponding surfaces of at least two pulleys.

7. A belt as in claim 6, wherein said elongated elements are in the form of nylon cords of a 940×2.48 z,48 s twists per cm type, forming 10 coils.

8. A belt as in claim 6, further comprising a pitch length of 1250 mm, a surface of the greater base of 9.5 mm, a height of 5.5 mm, an angle between said sides of 40°, and a distance between a surface of the smaller base and a plane containing the elongated elements corresponding to 3.8 mm.

9. A belt as in claim 8, comprising an ultimate tensile stress of 2460 N (Newton) and, at a stress of 246 N, an elongation of 2.56%.

10. A belt as in claim 1, wherein said annular body has an inner base surface formed by a plurality of grooves adopted to transmit forces by friction with a grooved surface of a pulley.

11. A belt as in claim 10, wherein said elongated elements are in the form of nylon cords of a 940×2, 48 z, 48 s twists per cm type, forming 17 coils.

12. A belt as in claim 10, comprising a pitch length of 1178 mm, 6 grooves and a distance of the ends of the groove from a plane containing said elongated elements corresponding to 3 mm.

13. A belt as in claim 12, comprising an ultimate tensile stress of 4000 N (Newton) and, at a stress of 400 N, an elongation of 2.27%.

14. A belt as in claim 1, wherein said annular body has a flat shape in cross section and at least one base surface adapted to come into contact with a cylindrical surface of a pulley.

15. A belt as in claim 1, wherein said elongation values range between 1% and 15%.

16. A driving system comprising an elastically extensible belt comprising an annular body made of elastomeric material; and a plurality of elongated elements resistant to tensile stress, embedded in said annular body along a surface substantially corresponding to the position of a neutral axis of said annular body, said belt being bent along a first curvature characterized by a circumference having a radius $r_1$ equal to 60% of a radius R of a circumferential development of said annular body corresponding to said elongated elements undergoing bending to which derive a first shrinkage value $\epsilon_1$ of a radially innermost surface of said annular body and bent along a second curvature characterized by a circumference having a radius $r_2$ equal to 35% of said radius R of said circumterential development undergoing bending to which derives a second shrinkage value $\epsilon_2$ of said radially innermost surface, of said elongated elements, at 1/10 of its ultimate tensile stress, having an elongation value that balances a shrinkage value ranging between said first and said second shrinkage value, and at least two pulleys, said belt being mounted between said pulleys in a state of elastic pretension.

17. A driving system as in claim 16, wherein said annular body has a V-shaped section and said pulleys comprise trapezoidal pulleys, said annular body being capable of being elastically extended between said trapezoidal pulleys, one of said pulleys having a trapezoidal race of variable depth.

18. A driving system as in claim 16, wherein said annular body comprises a grooved base surface and at least one of said two pulleys comprises a surface which is grooved so as to correspond to said grooved base surface of said annular body.

19. A driving system as in claim 16, wherein said annular body has a flat shape in cross section, and said pulleys comprise cylindrical outer surfaces.

* * * * *

UNITED STATES PATENT AND TRADEMARK OFFICE
CERTIFICATE OF CORRECTION

PATENT NO.  : 4,931,030
DATED       : June 5, 1990
INVENTOR(S) : ROBECCHI

It is certified that error appears in the above-identified patent and that said Letters Patent is hereby corrected as shown below:

Column 4, line 11, change "$\theta x \ (r-h)$" to --$\theta' x \ (r-h)$--.

Column 4, line 23, change "$\epsilon = \theta x \ (R-h) - \theta x \ (r-h)/$" to --$\epsilon = \theta x \ (R-h) - \theta' x \ (r-h)/$--.

Column 4, line 56, change "$100 = 1.08$" to --$100 = 1.08\%$.--

Column 5, line 22, change "Radius of pitch layout $R = L/2^\pi$" to --Radius of pitch layout $R = L/2\pi$--.

Column 7, line 54, change "1/10" to --1%--.

Column 10, line 42, before "of" second occurrence insert --each--.

Signed and Sealed this

Tenth Day of September, 1991

*Attest:*

HARRY F. MANBECK, JR.

*Attesting Officer*     *Commissioner of Patents and Trademarks*